US008769368B2

(12) United States Patent
He et al.

(10) Patent No.: US 8,769,368 B2
(45) Date of Patent: Jul. 1, 2014

(54) METHOD AND SYSTEM FOR DETECTING THE FRAME BOUNDARY OF A DATA STREAM RECEIVED IN FORWARD ERROR CORRECTION LAYER IN THE ETHERNET

(75) Inventors: Yin He, Shanghai (CN); Yi Fan Lin, Shanghai (CN); Yang Liu, Shanghai (CN); Hao Yang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 13/391,936

(22) PCT Filed: Jul. 29, 2010

(86) PCT No.: PCT/EP2010/061069
§ 371 (c)(1),
(2), (4) Date: Feb. 23, 2012

(87) PCT Pub. No.: WO2011/023489
PCT Pub. Date: Mar. 3, 2011

(65) Prior Publication Data

US 2012/0179950 A1 Jul. 12, 2012

(30) Foreign Application Priority Data

Aug. 28, 2009 (CN) .......................... 2009 1 0168619

(51) Int. Cl.
*H04L 7/04* (2006.01)

(52) U.S. Cl.
CPC ..................................... *H04L 7/048* (2013.01)
USPC ........... 714/752; 714/755; 714/758; 714/785; 370/514

(58) Field of Classification Search
USPC ................... 714/752, 755, 758, 785; 370/514
See application file for complete search history.

(56) References Cited

U.S. PATENT DOCUMENTS

| | | | | |
|---|---|---|---|---|
| 5,128,945 | A | 7/1992 | Enns et al. | |
| 5,673,296 | A | 9/1997 | Ohgane | |
| 7,050,373 | B2 * | 5/2006 | Tonami et al. | 369/47.48 |
| 7,152,199 | B2 * | 12/2006 | Nuyen et al. | 714/776 |
| 8,208,499 | B2 | 6/2012 | Sun et al. | |
| 2007/0157060 | A1 | 7/2007 | Ganga et al. | |
| 2009/0254793 | A1 * | 10/2009 | Takahashi et al. | 714/776 |

FOREIGN PATENT DOCUMENTS

| | | | |
|---|---|---|---|
| CN | 1630281 | B | 5/2012 |
| EP | 0285158 | B1 | 6/1994 |
| EP | 1983677 | A2 | 10/2008 |
| EP | 1487146 | B1 | 4/2009 |
| JP | H10178406 | A | 6/1998 |
| JP | 2004214743 | A | 7/2004 |
| WO | 2009062357 | A1 | 5/2009 |

OTHER PUBLICATIONS

"Parallel Frame Synchronization Systems Based on Continuity Validation", Liu Zhao, Jin De-peng, Zeng Lie-guang, Dept. of Electronic Engineering, Tsinghua University, Beijing 100084, China, vol. 33, No. 7, Jul. 2005.

(Continued)

*Primary Examiner* — Sam Rizk
(74) *Attorney, Agent, or Firm* — Grant A. Johnson

(57) ABSTRACT

The present invention discloses a method and system for detecting the frame boundary of a data stream received in Forward Error Correction layer in the Ethernet. The present invention can increase the speed of frame boundary detection and the speed of frame synchronization without adding any overheads of hardware.

20 Claims, 5 Drawing Sheets

(56) References Cited

OTHER PUBLICATIONS

Dodds, David E. et al., "ATM Framing Using CRC Byte", IEEE 1994, pp. 410-414.
IEEE Standard for Information Technology, Part 3: "Carrier Sense Multiple Access with Collision Detection (CSMA/CD) Access Method and Physical Layer Specifications", Amendment 4: Ethernet Operation over Electrical Backplanes, XP-002609736, May 22, 2007.
International PCT Search Report, Dec. 3, 2010 for International application No. PCT/EP2010/061069.
Belogolovy, Andrey et al., "Forward Error Correction Proposal for 10G Backplane Ethernet", ganga_02_0905.pdf URL http://grouper.ieee.org/groups/802/3/ap/public/sep05/.

* cited by examiner

METHOD AND SYSTEM FOR DETECTING THE FRAME BOUNDARY OF A DATA STREAM RECEIVED IN FORWARD ERROR CORRECTION LAYER IN THE ETHERNET

FIELD OF THE INVENTION

The present invention generally relates to a data processing method and system, and more particularly, to a method and system for detecting the frame boundary of a data stream received in Forward Error Correction layer in the Ethernet.

BACKGROUND OF THE INVENTION

Clause 74 of IEEE Standard 802.3ap-2007 (the latest version is IEEE 802.3-2008) and IEEEP 802.3 D1.2 define a Forward Error Correction (FEC for short) sub-layer of a BASE-R physical layer applied to the 10 G Ethernet. This FEC sub-layer standard improves the BER rate of the system from $10^{-7}$ to $10^{-12}$ and this standard also descends to the 40 G/100 G Ethernet applications.

To be compatible with different Ethernet application layers, this protocol specifies that the FEC layer compresses the original frame header to set aside space for uploading FEC check bits, so that it is ensured this layer keeps the same frame length (Clause 74 of IEEE Standard 802.3ap-2007 defines a frame length of 2112 bits) as other application layers. However, such a processing method makes it quite difficult to identify the frame boundary between respective frames at the receiver side, and a large quantity of time is required for synchronization to the transmitter-side frames so as to find correct frame boundary positions.

FIG. 1 shows a universal circuit structure for frame synchronization as defined in Clause 74 of IEEE Standard 802.3ap-2007. A method used by this circuit structure comprises:

a) testing an assumed frame boundary position;

a1) descrambling received data by a PN-2112 generator starting from this assumed frame boundary position;

a2) performing an FEC check for data with the length of a frame starting from the assumptive frame boundary;

i) if the check does not match (i.e., the received check bit does not match the computed check bit), shifting the assumed frame boundary position by one bit position and repeating step a);

b) for an assumed frame boundary, confirming that the FEC check of each of n consecutive frames is correct;

b1) if the FEC check of any of the n consecutive frames is not correct, shifting the assumed frame boundary position by one bit position and re-starting the entire frame synchronization procedure;

b) if the FEC check of each of the n consecutive frames being received is correct, going to step c);

c) establishing frame synchronization;

d) if the FEC check of each of m consecutively received data frames is not correct, deeming frame synchronization as stepping out and re-starting the entire frame synchronization procedure.

For a frame length of 2112 bits, the above steps are repeated for at most 2111 times to traverse all of the possible 2112 positions to find a correct frame boundary position. Typically m=8 and n=4 in the above description.

In brief, frame synchronization logic needs to locate a correct frame boundary position in a frame such that the frame synchronization could be achieved. A defect in common method is that many frames are discarded so as to be adapted to the steps of one-bit shifting at a time, before finding a correct frame start position.

FIG. 2 schematically shows how to achieve frame synchronization by the common method. According to FIG. 2, the frame synchronization logic does not know the correct start position at the beginning, so it will assume a frame start position and check the assumed frame. But when the last bit of the first frame data is put into the frame synchronization logic, the frame synchronization logic cannot give a check result of this frame at once. This is because there is a delay caused by a pipeline structure-based design in the hardware implementation, which delay is caused by some function logic like scramble logic and is unavoidable. After this pipeline delay, if the frame synchronization logic detects that the position of the first frame boundary is not correct, the frame synchronization logic needs to assume the next frame boundary after shifting a subsequent assumptive frame boundary position by one bit. Due to the pipeline delay as shown in FIG. 2, there is no time to one-bit shift from the frame boundary of the second frame and proceed the checking for the second frame data at this moment. Hence, the frame synchronization logic has to discard all the second frame data. Then until the third frame data comes, the frame synchronization logic will make one-bit shifting based on the frame boundary of the third frame and repeat the check for the third frame as is done in the first frame.

So in the worst case, the frame synchronization logic will check 2112 frames, discard 2111 frames and perform 2111 one-bit shifts, which will take (2112+2111)*2112+2111=8, 921,087 BT (bit time) to get the correct frame boundary (i.e. the frame's correct start bit). This synchronization time is much longer than other high-speed interfaces working on a close data rate (such as about 600,000 BT for SATA2.0 and about 500,000 BT for PCIE2.0).

SUMMARY OF THE INVENTION

Different from the above position algorithm of one-bit shifting at a time as described by IEEE Standard 802.3ap-2007, the present invention optimizes a method and system for detecting the frame boundary of a data stream received in Forward Error Correction layer in the Ethernet as well as a frame synchronization method and system for a data stream at the Forward Error Correction layer.

According to an aspect of the present invention, there is disclosed a method for detecting the frame boundary of a data stream received in Forward Error Correction layer in the Ethernet, the method comprising:

intercepting data with the length of a frame from the data stream;

validating FEC check for the data with the length of a frame from the start position of the data with the length of a frame;

if the FEC check for the data with the length of a frame is not correct, then from the next bit of the ending position of the data with the length of a frame, assuming the data stream position jumping sbn bits as the start position of next frame of data to be intercepted, wherein sbn is an integer that is larger than the pipeline delay of the hardware circuit in FEC layer in the Ethernet and is prime with the length of the frame;

returning to the intercepting step;

if the FEC check for the data with the length of a frame is correct, determining the start position of the current data with the length of a frame to be the frame boundary position of the data stream.

According to another aspect of the present invention, there is disclosed a frame synchronization method for a data stream received in Forward Error Correction layer in an Ethernet, the method comprising:

intercepting data with the length of a frame from the data stream;

validating FEC check for the data with the length of a frame from the start position of the data with the length of a frame;

if the FEC check for the data with the length of a frame is not correct, then from the next bit of the ending position of the data with the length of a frame, assuming the data stream position jumping sbn bits as the start position of next frame of data to be intercepted, wherein sbn is an integer that is larger than the pipeline delay of the hardware circuit in FEC layer in the Ethernet and is prime with the length of the frame;

returning to the step of intercepting;

if the FEC check for the data with the length of a frame is correct, determining FEC check for next n consecutive data with the length of a frame is correct or not, wherein n is an integer larger than 1;

if the FEC check for any of the next n consecutive data with the length of a frame is not correct, then from the next bit of the ending position of the data with the length of a frame, assuming the data stream position jumping sbn bits as the start position of next frame of data to be intercepted, wherein sbn is an integer that is larger than the pipeline delay of the hardware circuit in FEC layer in the Ethernet and is prime with the length of the frame;

returning to the step of intercepting;

if the FEC check for each of the next n consecutive data with the length of a frame is correct, then determining that the data is in frame synchronization.

According to a further aspect of the present invention, there is disclosed a system for detecting the frame boundary of a data stream received in Forward Error Correction layer in the Ethernet, the system comprising:

intercepting means for intercepting data with the length of a frame from the data stream;

FEC validating means for validating FEC check for the data with the length of a frame from the start position of the data with the length of a frame;

jumping means for, if the FEC check for the data with the length of a frame is not correct, then from the next bit of the ending position of the data with the length of a frame, assuming the data stream position jumping sbn bits as the start position of next frame of data to be intercepted, wherein sbn is an integer that is larger than the pipeline delay of the hardware circuit in FEC layer in the Ethernet and is prime with the length of the frame;

wherein after the jumping means jumps sbn bits, the intercepting means intercepts next data with the length of a frame till the FEC validating means validates that the FEC check for the intercepted data with the length of a frame is correct, then the start position of the current data with the length of a frame is determined to be the frame boundary position of the data stream.

According to a still further aspect of the present invention, there is disclosed a frame synchronization system for a data stream received in Forward Error Correction layer in the Ethernet, the system comprising:

intercepting means for intercepting data with the length of a frame from the data stream;

FEC validating means for validating FEC check for the data with the length of a frame from the start position of the data with the length of a frame;

jumping means for, if the FEC check for the data with the length of a frame is not correct, then from the next bit of the ending position of the data with the length of a frame, assuming the data stream position jumping sbn bits as the start position of next frame of data to be intercepted, wherein sbn is an integer that is larger than the pipeline delay of the hardware circuit in FEC layer in the Ethernet and is prime with the length of the frame;

determining means for determining, if the FEC check for the data with the length of a frame is correct, whether the FEC check for next n consecutive data with the length of a frame is correct or not, wherein n is an integer larger than 1;

wherein after the jumping means jumps sbn bits, the intercepting means intercepts next data with the length of a frame, till the FEC validating means validates that the FEC check for the intercepted data with the length of a frame is correct, then the determining means determines whether FEC checks for the next n consecutive data with the length of a frame is correct or not; if the determining means determines that the FEC check for any of the next n consecutive data with the length of a frame is not correct, then after the jumping means jumps sbn bits again, the intercepting means intercepts next data with the length of a frame; if the determining means determines that the FEC check for each of the next n consecutive data with the length of a frame is correct, it determines that the data is in frame synchronization.

With the technical solution of the present invention, it is possible to adjust the number of jumps dependent upon different pipeline delays in the Forward Error Correction layer hardware design and thereby increase the speed of frame boundary detection and achieve rapid frame synchronization. In addition, the present invention does not increase any overheads of hardware while increasing the speed of frame boundary detection and the speed of frame synchronization by almost one time. The method of the present invention applies to not only 10 G/40 G/100 G Ethernet specified in the standard but also any bandwidth of Ethernet. Meanwhile, the method of the present invention applies to both the BASE-R transmission medium adopted in the standard and any transmission medium of Ethernet.

BRIEF DESCRIPTION ON THE DRAWINGS

The above and other objects, features and advantages of the present invention will become more apparent from the following description of exemplary embodiments, taken in conjunction with the figures wherein like reference numerals usually designate the same components of the exemplary embodiments:

FIG. 1 shows a generic circuit structure for frame synchronization as defined in Clause 74 of IEEE Standard 802.3ap-2007;

FIG. 2 schematically shows how to implement frame synchronization by the common method;

FIG. 3*a* shows the case of one-bit jumping at a time for a frame with the length of seven bits;

FIG. 3*b* shows the case of three-bit jumping at a time for a frame with the length of seven bits;

FIG. 4 schematically shows how to perform frame boundary detection by using the sbn-bit jumping according to the present invention;

DESCRIPTION OF THE PREFERRED EMBODIMENTS

A detailed description will be given to preferred embodiments of the present invention by referring to the figures in which the preferred embodiments are shown. However, the present invention may be implemented in various manners and should not be construed as being limited to the embodiments described here. On the contrary, these embodiments are provided in order to make the present invention more thorough and complete and entirely convey the scope of the present invention to those skilled in the art.

In existing solutions, due to the presence of the pipelined structure in hardware, half of frames have to be discarded when using method that jumps one bit at a time. This causes a time delay in the frame boundary detection and a low speed of the frame synchronization. If the FEC check for the first assumptive frame boundary position fails, the method in the prior art is intended to traverse the remaining 2111 possible frame boundary positions through 2111 one-bit jumps. The inventors of the present invention propose that compared with jumping one bit at a time, if the number of bits is prime with 2112, or the length of a frame (i.e. the number of bits and the length of a frame has no common divisor except for 1), then all possible frame boundary positions will be traversed through 2111 shifts. In this way, the speed of frame boundary detection is improved and the time of frame synchronization is saved without discarding almost half of frames.

Figure 3A:
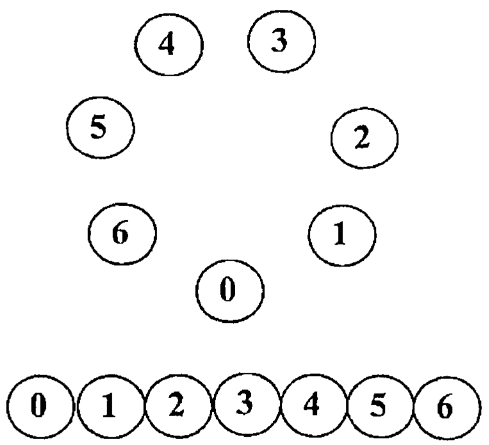

For example, FIG. 3*a* shows the case of one-bit jumping at a time for a frame with the length of seven bits. As shown in FIG. 3*a*, in the case of jumping one bit at a time, seven possible frame start positions may be traversed completely by six one-bit shifts, i.e. 0-1, 1-2, 2-3, 3-4, 4-5, and 5-6. In particular, the procedure is as below: in FIG. 3*a* the seven points are seven positions at which the frame boundary might be located; initially it is checked whether point 0 is the frame header or not; if not, the checked position is jumped by one position (counter-clockwise) to point 1, and so on and so forth. In this way, all of the seven positions at which the frame boundary might be located will be traversed through six jumps, i.e. in an order of 0→1→2→3→4→5→6. Here, the bit number of jumping is 1.

Figure 3B:
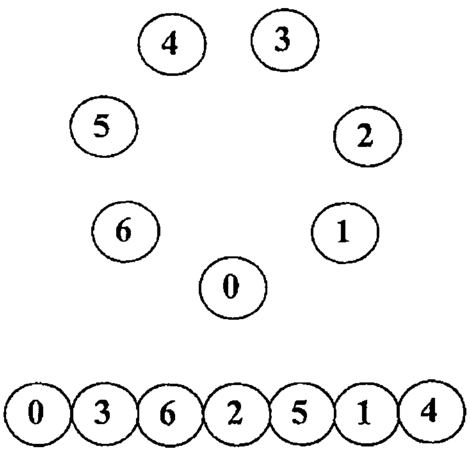

FIG. 3*b* shows the case of jumping three bits at a time for a frame with the length of seven bits. As shown in FIG. 3*b*, in the case of jumping three bits at a time, seven candidate bits may be completely traversed through six three-bit jumps, i.e. 0-3, 3-6, 6-2, 2-5, 5-1, and 1-4. In particular, the procedure is as below: in FIG. 3*b* the seven points are seven positions at which the frame boundary might be located; initially it is checked whether point 0 is the frame header or not; if not, the checked position is jumped by three positions (counter-clockwise) to point 3, and so on and so forth. In this way, all of the seven positions at which the frame boundary might be located will be traversed through six shifts, i.e. in an order of 0→3→6→2—43 5→1→4. Here, the jumping number of 3 and the frame length of 7 are prime with each other.

For data with the length of a frame, assuming the frame length is fl, the number of bits being jumped at a time is sbn, and fl and sbn are prime with each other, each position of the frame will be traversed through fl−1 shifts.

What shall be proven is that for any integer 0≤a<b<fl, (a×sbn)mod fl≠(b×sbn)mod fl establishes. In other words, for any different jumping numbers a,b∈(0, fl−1), the positions after the jumping are different as well. Therefore, all possible frame header positions will be traversed through fl−1 jumps.

The above inequation could be proved by refutation as below.

As fl and sbn are prime with each other, it is clear from the characteristic of co-prime numbers that fl and sbn have the smallest common multiple of (fl×sbn); assuming integers a and b meet 0≤a<b<fl and there is a group of a and b which meet (a×sbn)mod fl=(b×sbn)mod fl, for the group of a and b $$(b\times sbn)\bmod \mathrm{fl}-(a\times sbn)\bmod \mathrm{fl}=0$$

According to the associative law of modulus operations $$(b\times sbn-a\times sbn)\bmod \mathrm{fl}=0$$

$$[(b-a)\times sbn]\bmod \mathrm{fl}=0$$

To establish the above equations, it is necessary to find the integer [(b−a)×sbn] that is divisible by fl (obviously [(b−a)×sbn] is divisible by sbn).

0≤a<b<fl, and thus 0<(b−a)<fl

And further 0<[(b−a)×sbn]<(fl×sbn)

As the smallest common multiple for fl and sbn is (fl×sbn), there is no integer [(b−a)×sbn] that is less than (fl×sbn) and is divisible by both sbn and fl, and in turn it is assumed that the equation is not established.

Therefore, for any integer 0≤a<b<fl, (a×sbn)mod fl≠(b×sbn)mod fl establishes.

In this manner, it is possible to traverse each position in a frame by selecting the jumping number (assume that the jumping number is sbn hereafter) to be a prime number with the length of the frame.

Due to the pipeline delay in hardware, however, if sbn is less than the pipeline delay, data of the second frame has to be discarded. In the present invention, sbn is thus larger than the pipeline delay in hardware. It would be appreciated by those skills in the art that since the length of data and the time duration correspond to each other in the art, they can be used without differentiation. For example, since the pipeline delay itself is a unit of time duration and the unit of time duration corresponds to a unit of data stream length, i.e. bits, in communication systems, those skilled in the art use bits to denote the pipeline delay directly.

Figure 4:
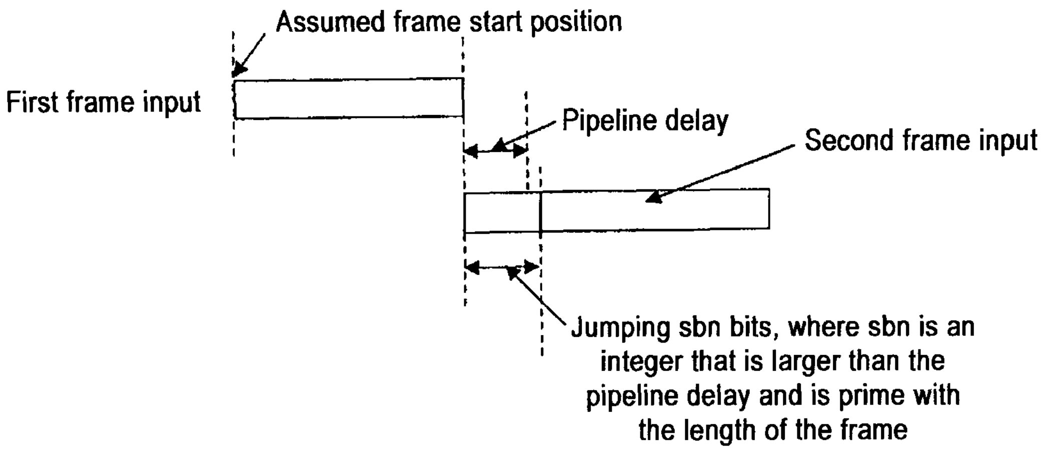

FIG. 4 schematically shows how to perform frame boundary detection by using sbn according to the present invention. As shown in FIG. 4, the frame synchronization logic does not know the correct frame start position initially, and it thus assumes the start position of intercepted data with the length of a frame as the frame boundary position. If the frame synchronization logic detects that the assumed frame boundary position is not correct, it assumes the subsequently received data jumping sbn bits as the start position of the next intercepted data with the length of a frame. At this moment, since sbn is larger than the pipeline delay as shown in FIG. 4, an equation for calculating the jumping number and a method of calculating a frame synchronization time can be derived from the following equations:

Assuming the length of a frame requiring frame synchronization is fl and the pipeline delay is K, the possible values of jumping number sbn are sbn≥K, and sbn is prime with fl The frame synchronization time in the worst case is $$\mathrm{fl}\times\mathrm{fl}+(\mathrm{fl}-1)\times sbn$$

Data of the second frame does not need to be discarded, and only sbn bits are discarded. In this manner, the bit number of discarded data is minimized, so that both the time of frame boundary detection and the frame synchronization time are saved.

Figure 5:
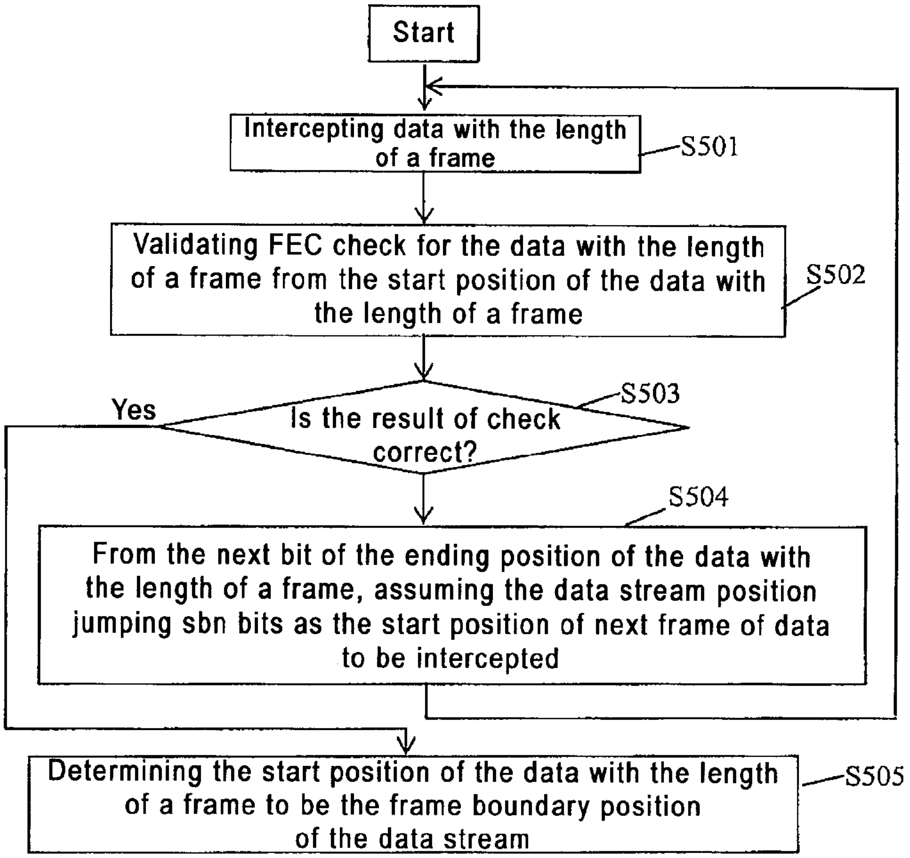
FIG. 5 shows a flow of a method for detecting the frame boundary of the data stream in FIG. 4.

FIG. 5 shows a flow of a method for detecting the frame boundary of the data stream in FIG. 4. As shown in FIG. 5, at step S501, data with the length of a frame is intercepted from the data stream; at step S502, validating FEC check for the data with the length of a frame from the start position of the data; at step S503, decision is made as to whether the FEC check for the data with the length of a frame is correct or not, wherein the FEC check may utilize a check method defined in Clause 74 of IEEE Standard 802.3ap-2007; if the FEC check for the data with the length of a frame is not correct, then from the next bit of the ending position of the data with the length of a frame, the data stream position jumping sbn bits is assumed as the start position of next frame of data to be intercepted, wherein sbn is an integer that is larger than the pipeline delay of the hardware circuit in FEC layer in the Ethernet and is prime with the length of the frame; then the flow returns to the intercepting step S502; if the FEC check for the data with the length of a frame is correct, then the start position of the data with the length of a frame is determined at step S505 to be the frame boundary position of the data stream.

Figure 6:
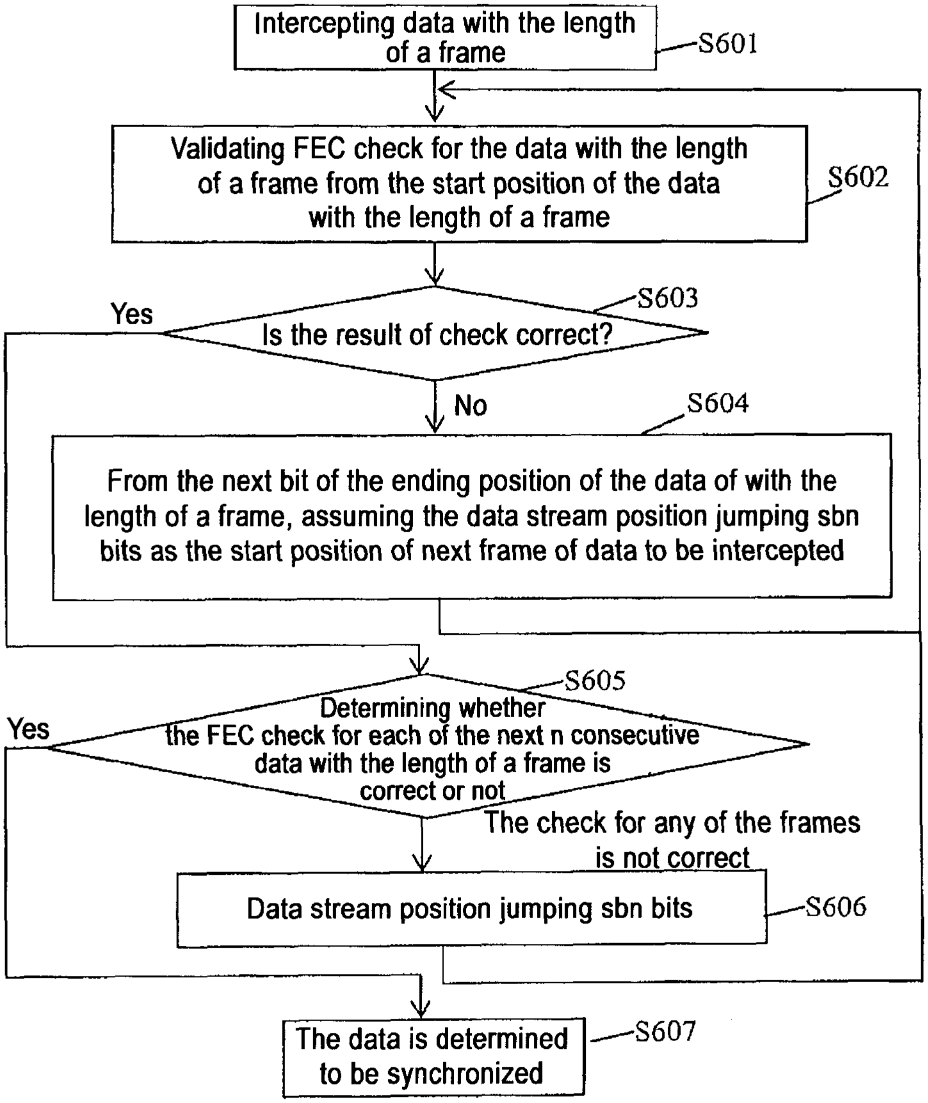
FIG. 6 shows a flow of a frame synchronization method for a data stream in Forward Error Correction layer in the Ethernet according to an embodiment of the present invention.

FIG. 6 shows a flow of a frame synchronization method for a data stream in Forward Error Correction layer in the Ethernet according to an embodiment of the present invention. As shown in FIG. 6, at step S601, data with the length of a frame is intercepted from the data stream; at step S602, validating FEC check for the data with the length of a frame from the start position of the data; at step S603, decision is made as to whether the FEC check for the data with the length of a frame is correct or not; if not, then at step S604, from the next bit next of the ending position of the data with the length of a frame, the data stream position jumping sbn bits is assumed as the start position of next data frame to be intercepted, wherein sbn is an integer that is larger than the pipeline delay of the hardware circuit in FEC layer in the Ethernet and is prime with the length of the frame; then the flow returns to the intercepting step S602; if the FEC check for the data with the length of a frame is correct, decision is made as to whether FEC check for next n consecutive data with the length of a frame is correct or not, wherein n is an integer larger than 1; if it is determined at step S605 that the FEC check for any of the next n consecutive data with the length of a frame is not correct, then at step S606, from the next bit of the ending position of the data with the length of a frame, the data stream position jumping sbn bits is assumed as the start position of next frame of data to be intercepted, wherein sbn is an integer that is larger than the pipeline delay of the hardware circuit in FEC layer in the Ethernet and is prime with the length of the frame; then the flow returns to step of intercepting data with the length of a frame from the data stream; if the FEC check for each of the next n consecutive data with the length of a frame is correct, then it is determined at step S607 that the data is in frame synchronization.

In the flows of FIGS. 5 and 6, sbn is an integer that is larger than the pipeline delay of the hardware circuit in FEC layer in the Ethernet and is prime with the length of the frame. Hence, there may be a plurality of values that sbn could take. If sbn is the smallest one of integers that are larger than the pipeline delay of the hardware circuit in FEC layer in the Ethernet and are prime with the length of the frame, then at this point, the frame synchronization time is the shortest according to the equation for frame synchronization time in the worst case. In addition, as the pipeline delay in the hardware circuit in FEC layer in the Ethernet is to be used during the procedure, in an embodiment, further comprised is determining the pipeline delay in the hardware circuit in FEC layer in the Ethernet. Furthermore, according to the requirements of Clause 74 of IEEE Standard 802.3ap-2007, it is necessary to descramble the data with the length of a frame before performing an FEC check for the same data.

With the method of the present invention, if the pipeline delay is 96 BT and the jumping number is selected to 97 (97 is prime with 2112), then the frame synchronization time is minimized to 2112*2112+2111*97=4,665,311 BT, half of 8,921,087 BT with the method of the prior art. With the method of the present invention, it is unnecessary to discard data of one entire frame after each shift, and what is discarded is only the data of the same bits as the jumping number. Therefore, the smaller the jumping number, the less bits of data is discarded, and in turn, the higher speed of frame synchronization is achieved.

Figure 7:
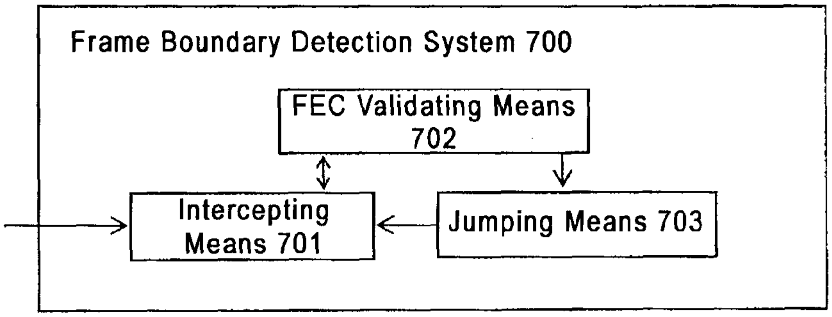
FIG. 7 shows a structural block diagram of a system for detecting the frame boundary of a data stream received in Forward Error Correction layer in the Ethernet.

Under the same inventive concept, FIG. 7 shows a structural block diagram of a system 700 for detecting the frame boundary of a data stream in Forward Error Correction layer in the Ethernet. As shown in FIG. 7, the system comprises: intercepting means 701 for intercept data with the length of a frame from the data stream; FEC validating means 702 for validating FEC check for the data with the length of a frame from the start position of the data; jumping means 703 for, if the FEC check for the data with the length of a frame is not correct, then from the next bit next of the ending position of the data with the length of a frame, assuming the data stream position jumping sbn bits as the start position of next frame of data to be intercepted, wherein sbn is an integer that is larger than the pipeline delay of the hardware circuit in FEC layer in the Ethernet and is prime with the length of the frame; wherein after the jumping means jumps sbn bits, the intercepting means intercepts the next data with the length of a frame, till the validating means validates that the FEC check for the intercepted data with the length of a frame is correct, then the start position of the data with the length of a frame is determined to be the frame boundary position of the data stream.

Figure 8:
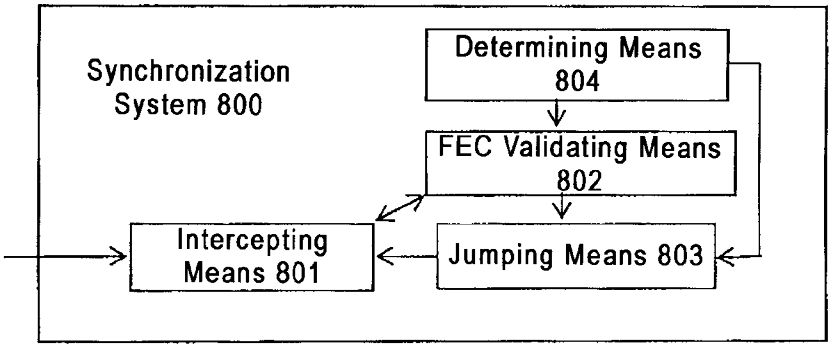
FIG. 8 shows a structural block diagram of a frame synchronization system for a data stream received in Forward Error Correction layer in the Ethernet.

Under the same inventive concept, FIG. 8 shows a structural block diagram of a frame synchronization system 800 for a data stream received in Forward Error Correction layer in the Ethernet. As shown in FIG. 8, the system comprises: intercepting means 801 for intercepting data with the length of a frame from the data stream; FEC validating means 802 for validating FEC check for the data with the length of a frame from the start position of the data; jumping means 803 for, if the FEC check for the data with the length of a frame is not correct, then from the next bit of the ending position of the data with the length of a frame, assuming the data stream position jumping sbn bits as the start position of next frame of data to be intercepted, wherein sbn is an integer that is larger than the pipeline delay of the hardware circuit in FEC layer in the Ethernet and is prime with the length of the frame; determining means 804 for determining, if the FEC check for the data with the length of a frame is correct, whether the FEC check for the next n consecutive data with the length of a frame is correct or not, wherein n is an integer larger than 1; wherein after the jumping means 803 jumps sbn bits, the intercepting means 801 intercepts the next data with the length of a frame till the FEC validating means 802 validating means validates that the check for the intercepted data with the length of a frame is correct, then the determining means 804 determines whether the FEC checks for the next n consecutive data with the length of a frame is correct; if the determining means 804 determines that FEC check for any of the next n consecutive data with the length of a frame is not correct, then the jumping means 803 jumps sbn bits again, and the intercepting means 801 intercepts next data with the length of a frame for FEC check; if the determining means

804 determines that FEC check for each of the next n consecutive data with the length of a frame is correct, then the determining means determines that the data is in frame synchronization.

In the system 700 for detecting the frame boundary as shown in FIG. 7 and the frame synchronization system 800 as shown in FIG. 8, sbn is an integer that is larger than the pipeline delay of the hardware circuit in FEC layer in the Ethernet and is prime with the length of the frame. Hence, there may a plurality of values that sbn could take. If sbn is the smallest one of integers that are larger than the pipeline delay of the hardware circuit in FEC layer in the Ethernet and are prime with the length of the frame, then at this point the frame synchronization time is the shortest according to the equation for frame synchronization time in the worst case. Furthermore, according to the requirements of Clause 74 of IEEE Standard 802.3ap-2007, these two systems need a descrambler for descrambling the data with the length of a frame before the FEC checker performs an FEC check for the same data.

Figure 1:
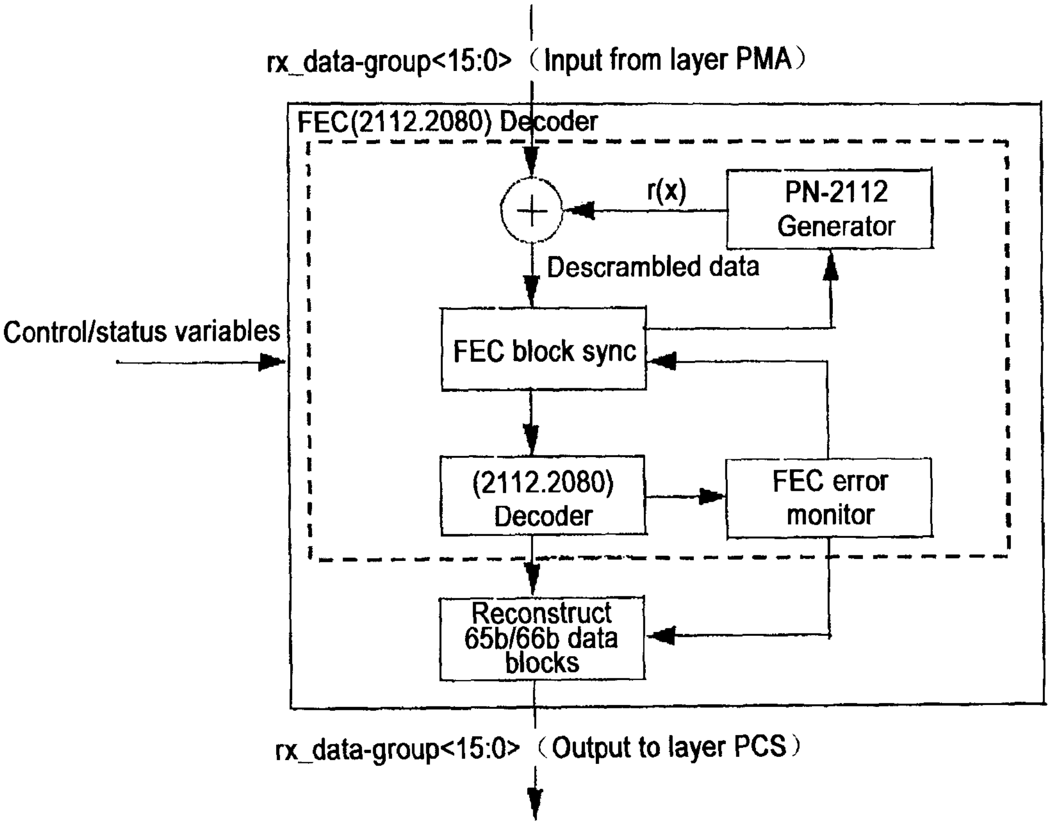
Figure 2:
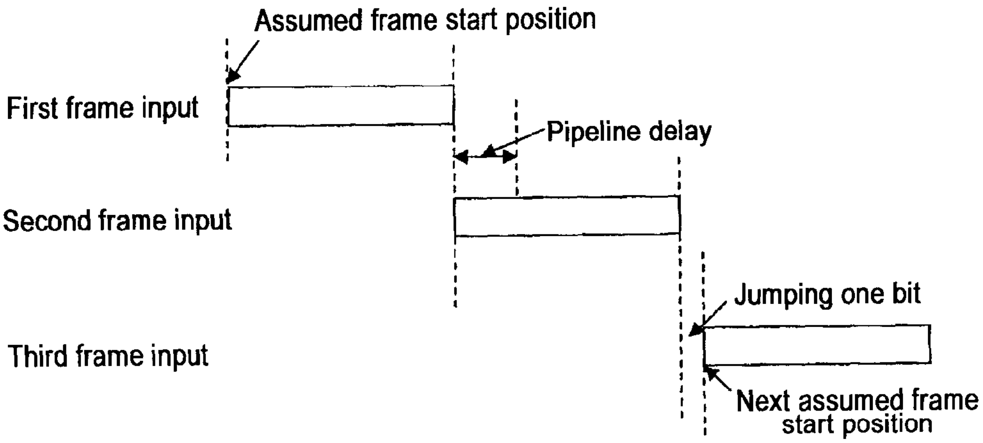

The present invention may be used for improving the FEC decoder as shown in FIG. 1. Specifically, the present invention may be used for improving the FEC block frame synchronization module as shown in FIG. 1 and may increase the speed of detecting the frame boundary of a received data stream and the frame synchronization speed without increasing overheads of hardware.

Although exemplary embodiments of the present invention have been described with reference to the figures, it is to be understood that the present invention is not limited to these concrete embodiments, and those skilled in the art may make various alterations and modifications to the embodiments without departing from the scope and principle of the present invention. All these alterations and modification are intended to be included in the scope of the present invention as defined by the appended claims.

Those skilled in the art would appreciate from the foregoing description that the present invention can be embodied as an apparatus, a method or a computer program product. Therefore, the present invention can be implemented as full hardware, full software (including firmware, resident software, micro-code, etc.) or a combination of a software portion, referred to as a "circuit," "module" or "system" in the specification, and a hardware portion. In addition, the present invention can take a form of computer program product embodied in any tangible medium of expression, the medium containing computer-usable program code.

Any combination of one or more computer-usable or computer-readable media can be employed. The computer-usable or computer-readable medium may be, for example, without limitation to, an electric, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In addition, each block and a combination of respective blocks of the flow charts and/or block diagrams of the present invention may be implemented by computer program instructions. These computer program instructions may be provided to a processor of a universal computer, a dedicated computer or other programmable data processing apparatus to produce a machine such that means performing functions/operations specified in the blocks of the flow charts and/or block diagrams are produced by these instructions executed by a computer or other programmable data processing apparatus.

Or these computer program instructions may be stored in a computer readable medium that is capable of causing a computer or other programmable data processing apparatus to work in a specific manner. In this manner, the instructions stored in the computer readable medium produce an article of manufacture that comprises instruction means performing functions/operations specified in the blocks of the flow charts and/or block diagrams.

Or these computer program instructions may be uploaded to a computer or other programmable data processing apparatus such that a series of operating steps is performed on the computer or other programmable data processing apparatus to implement a computer-performed procedure. In this manner, the procedure of performing functions/operations specified in the blocks of the flow charts and/or block diagrams is provided by instructions executed on the computer or other programmable apparatus.

The flow charts and block diagrams of the figures illustrate architecture, functions and functions which might be implemented by a computer program product, methods and systems according to the embodiments of the present invention. Each block of the flowcharts or block diagrams may present a module, a program segment, or a portion of code, which comprises one or more executable instructions for implemented specified logic functions. It should be noted that in some alternative implementations, functions indicated in the blocks may be performed in a different order than what is described in the figures. For example, two consecutive blocks may be implemented in parallel substantially or in an inverse order, which depends on the functions being involved. In addition, each block and a combination of respective blocks of the flow charts and/or block diagrams may be implemented by a dedicated hardware-based system for performing specified functions or operations or by a combination of dedicated hardware and computer instructions.

What is claimed is:

1. A method for detecting the frame boundary of a data stream received in Forward Error Correction (FEC) layer in the Ethernet, the method comprising:

intercepting data with the length of a frame from the data stream;

validating FEC check for the data with the length of a frame from the start position of the data with the length of a frame;

if the FEC check for the data with the length of a frame is not correct, then from the next bit of the ending position of the data with the length of a frame, assuming the data stream position jumping sbn bits as the start position of next frame of data to be intercepted, wherein sbn is an integer that is larger than the pipeline delay of the hardware circuit in FEC layer in the Ethernet and is prime with the length of the frame;

returning to the intercepting step;

if the FEC check for the data with the length of a frame is correct, determining the start position of the current data with the length of a frame to be the frame boundary position of the data stream.

2. The method according to claim 1, further comprising determining the pipeline delay in a hardware circuit in Forward Error Correction layer in the Ethernet.

3. The method according to claim 2, wherein sbn is the smallest one of integers that are larger than the pipeline delay of the hardware circuit in FEC layer in the Ethernet and are prime with the length of the frame.

4. The method according to claim 2, wherein a descrambling operation is performed on the data with the length of a frame before validating FEC check for the data.

5. The method according to claim 1, wherein sbn is the smallest one of integers that are larger than the pipeline delay of the hardware circuit in FEC layer in the Ethernet and are prime with the length of the frame.

6. The method according to claim 1, wherein a descrambling operation is performed on the data with the length of a frame before validating FEC check for the data.

7. A frame synchronization method for a data stream received in Forward Error Correction (FEC) layer in the Ethernet, the method comprising:

intercepting data with the length of a frame from the data stream;

validating FEC check for the data with the length of a frame from the start position of the data with the length of a frame;

if the FEC check for the data with the length of a frame is not correct, then from the next bit of the ending position of the data with the length of a frame, assuming the data stream position jumping sbn bits as the start position of next frame of data to be intercepted, wherein sbn is an integer that is larger than the pipeline delay of the hardware circuit in FEC layer in the Ethernet and is prime with the length of the frame;

returning to the step of intercepting;

if the FEC check for the data with the length of a frame is correct, determining FEC check for next n consecutive data with the length of a frame is correct or not, wherein n is an integer larger than 1;

if the FEC check for any of the next n consecutive data with the length of a frame is not correct, then from the next bit of the ending position of the data with the length of a frame, assuming the data stream position jumping sbn bits as the start position of next frame of data to be intercepted, wherein sbn is an integer that is larger than the pipeline delay of the hardware circuit in FEC layer in the Ethernet and is prime with the length of the frame;

returning to the step of intercepting;

if the FEC check for each of the next n consecutive data with the length of a frame is correct, then determining that the data is in frame synchronization.

8. The method according to claim 7, further comprising determining the pipeline delay in a hardware circuit in Forward Error Correction layer in the Ethernet.

9. The method according to claim 8, wherein sbn is the smallest one of integers that are larger than the pipeline delay of the hardware circuit in FEC layer in the Ethernet and are prime with the length of the frame.

10. The method according to claim 8, wherein a descrambling operation is performed on the data with the length of a frame before validating FEC check for the data.

11. The method according to claim 7, wherein sbn is the smallest one of integers that are larger than the pipeline delay of the hardware circuit in FEC layer in the Ethernet and are prime with the length of the frame.

12. The method according to claim 7, wherein a descrambling operation is performed on the data with the length of a frame before validating FEC check for the data.

13. A system for detecting the frame boundary of a data stream received in Forward Error Correction (FEC) layer in the Ethernet, the system comprising:

intercepting means for intercepting data with the length of a frame from the data stream;

FEC validating means for validating FEC check for the data with the length of a frame from the start position of the data with the length of a frame;

jumping means for, if the FEC check for the data with the length of a frame is not correct, then from the next bit of the ending position of the data with the length of a frame, assuming the data stream position jumping sbn bits as the start position of next frame of data to be intercepted, wherein sbn is an integer that is larger than the pipeline delay of the hardware circuit in FEC layer in the Ethernet and is prime with the length of the frame;

wherein after the jumping means jumps sbn bits, the intercepting means intercepts next data with the length of a frame till the FEC validating means validates that the FEC check for the intercepted data with the length of a frame is correct, then the start position of the current data with the length of a frame is determined to be the frame boundary position of the data stream.

14. The system according to claim 13, wherein sbn is the smallest one of integers that are larger than the pipeline delay of the hardware circuit in FEC layer in the Ethernet and are prime with the length of the frame.

15. The system according to claim 14, further comprising a descrambler for performing a descrambling operation on the data with the length of a frame before the FEC validating means validates FEC check for the data.

16. The system according to claim 13, further comprising a descrambler for performing a descrambling operation on the data with the length of a frame before the FEC validating means validates FEC check for the data.

17. A frame synchronization system for a data stream received in Forward Error Correction layer in the Ethernet, the system comprising:

intercepting means for intercepting data with the length of a frame from the data stream;

FEC validating means for validating FEC check for the data with the length of a frame from the start position of the data with the length of a frame;

jumping means for, if the FEC check for the data with the length of a frame is not correct, then from the next bit of the ending position of the data with the length of a frame, assuming the data stream position jumping sbn bits as the start position of next frame of data to be intercepted, wherein sbn is an integer that is larger than the pipeline delay of the hardware circuit in FEC layer in the Ethernet and is prime with the length of the frame;

determining means for determining, if the FEC check for the data with the length of a frame is correct, whether the FEC check for next n consecutive data with the length of a frame is correct or not, wherein n is an integer larger than 1;

wherein after the jumping means jumps sbn bits, the intercepting means intercepts next data with the length of a frame, till the FEC validating means validates that the FEC check for the intercepted data with the length of a frame is correct, then the determining means determines whether FEC checks for the next n consecutive data with the length of a frame is correct or not; if the determining means determines that the FEC check for any of the next n consecutive data with the length of a frame is not correct, then after the jumping means jumps sbn bits again, the intercepting means intercepts next data with the length of a frame; if the determining means determines that the FEC check for each of the next n consecutive data with the length of a frame is correct, it determines that the data is in frame synchronization.

18. The system according to claim 17, wherein sbn is the smallest one of integers that are larger than the pipeline delay of the hardware circuit in FEC layer in the Ethernet and are prime with the length of the frame.

19. The system according to claim 18, further comprising a descrambler for performing a descrambling operation on the data with the length of a frame before the FEC validating means validates FEC check for the data.

20. The system according to claim 17, further comprising a descrambler for performing a descrambling operation on the data with the length of a frame before the FEC validating means validates FEC check for the data.

* * * * *